Figure 1:
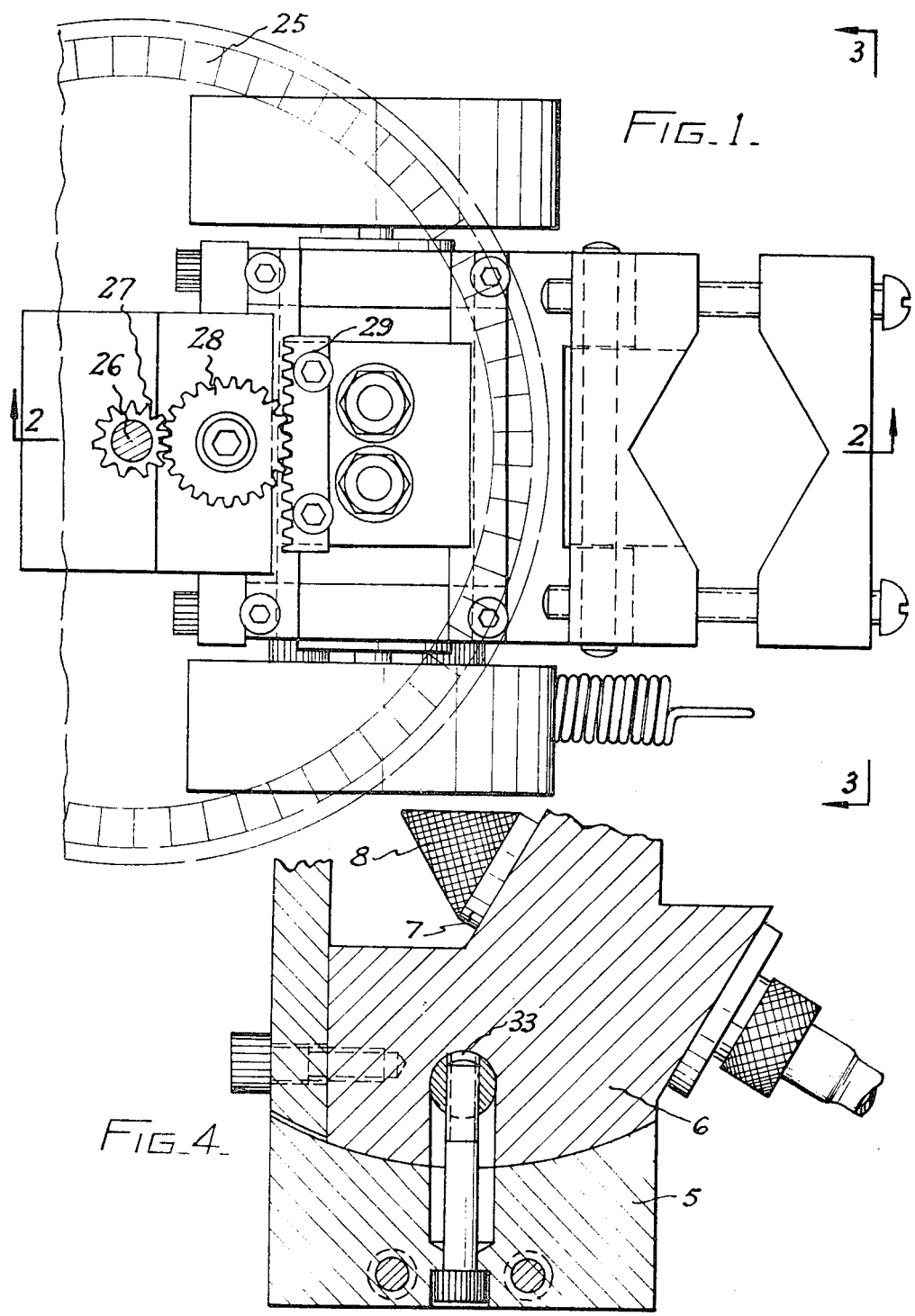

United States Patent

Savidge

[15] 3,636,775
[45] Jan. 25, 1972

[54] SPEED-MEASURING INSTRUMENT

[72] Inventor: Alexander B. Savidge, 33 Russell St., Oatley, New South Wales, Australia

[22] Filed: June 26, 1969

[21] Appl. No.: 836,858

[30] Foreign Application Priority Data

July 8, 1968 Australia.................................40364

[52] U.S. Cl............................................................73/507
[51] Int. Cl. ........................................................G01p 3/06
[58] Field of Search....................................................73/507

[56] References Cited

UNITED STATES PATENTS 2,158,137  5/1939  McConnell.............................73/507
2,935,311  5/1960  Kabelitz..................................73/507
2,949,781  8/1960  McCombs, Jr..........................73/507

FOREIGN PATENTS OR APPLICATIONS 22,454  7/1896  Great Britain..........................73/507
116,937  7/1918  Great Britain..........................73/507

Primary Examiner—James J. Gill
Assistant Examiner—Herbert Goldstein
Attorney—Stevens, Davis, Miller & Mosher

[57] ABSTRACT

A speed measuring device having a threaded shaft holding a threaded measuring disc thereon, this shaft being driven at an unknown speed. The periphery of the measuring disc engages a cone which is driven at a known speed causing the disc to move axially until it aligns with a diameter on the cone where the speeds correspond.

8 Claims, 4 Drawing Figures

SPEED-MEASURING INSTRUMENT

This invention relates to means for measuring and/or controlling the speed of an article or substance.

Although the invention is applicable to the measurement of the linear flow of yarn or similar material or the flow of liquids, it is described herein with reference to the measurement of the speed of rotation of a shaft, the motion of which may, of course, be caused by said article or substance.

Difficulties have been experienced in prior speed measuring systems when attempting to read out or give an indication of compound units involving linear volume quantities in terms of consumption per unit of distance or of production or of variable time. It is therefore an object of the invention to provide a simple method of mechanically relating one quantity to another when both said quantities are proportional to some rotational parameter, whereby the means which cause the rotation of some device can be brought together in a common instrument which is adapted to respond to or indicate relative rotations.

In accordance with the invention a speed measuring and/or controlling instrument comprises a positively driven rotatable member movable at a known or preset speed, a measuring shaft rotatable at an unknown speed, and a rotatable measuring disc adapted to engage frictionally with a rolling motion said rotatable member, said measuring disc being fitted concentrically about said measuring shaft so as to be freely rotatable thereabout, whereby the axial translation of said disc along it axis of rotation indicates the speed of said measuring shaft.

Figure 2:
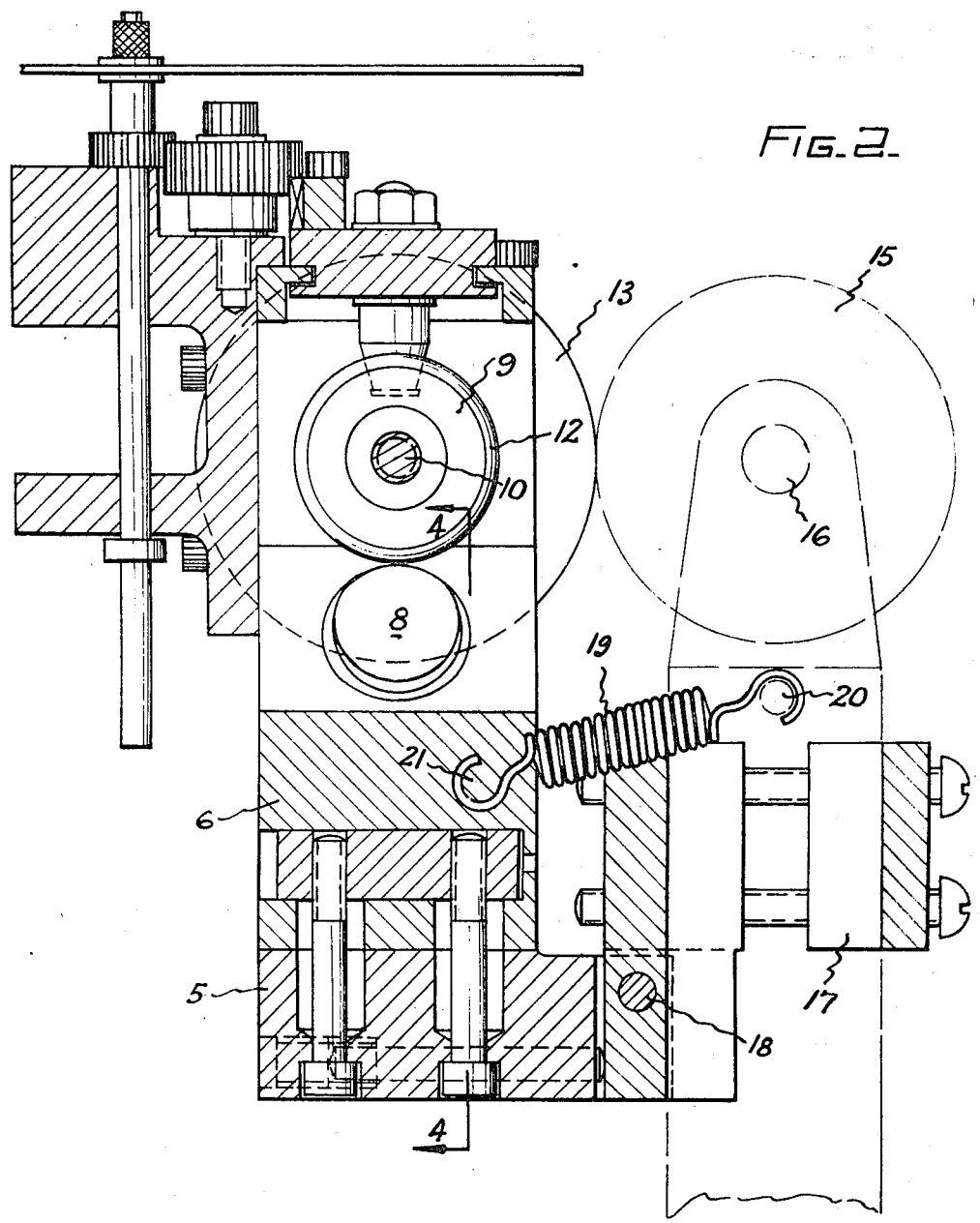
Figure 3:
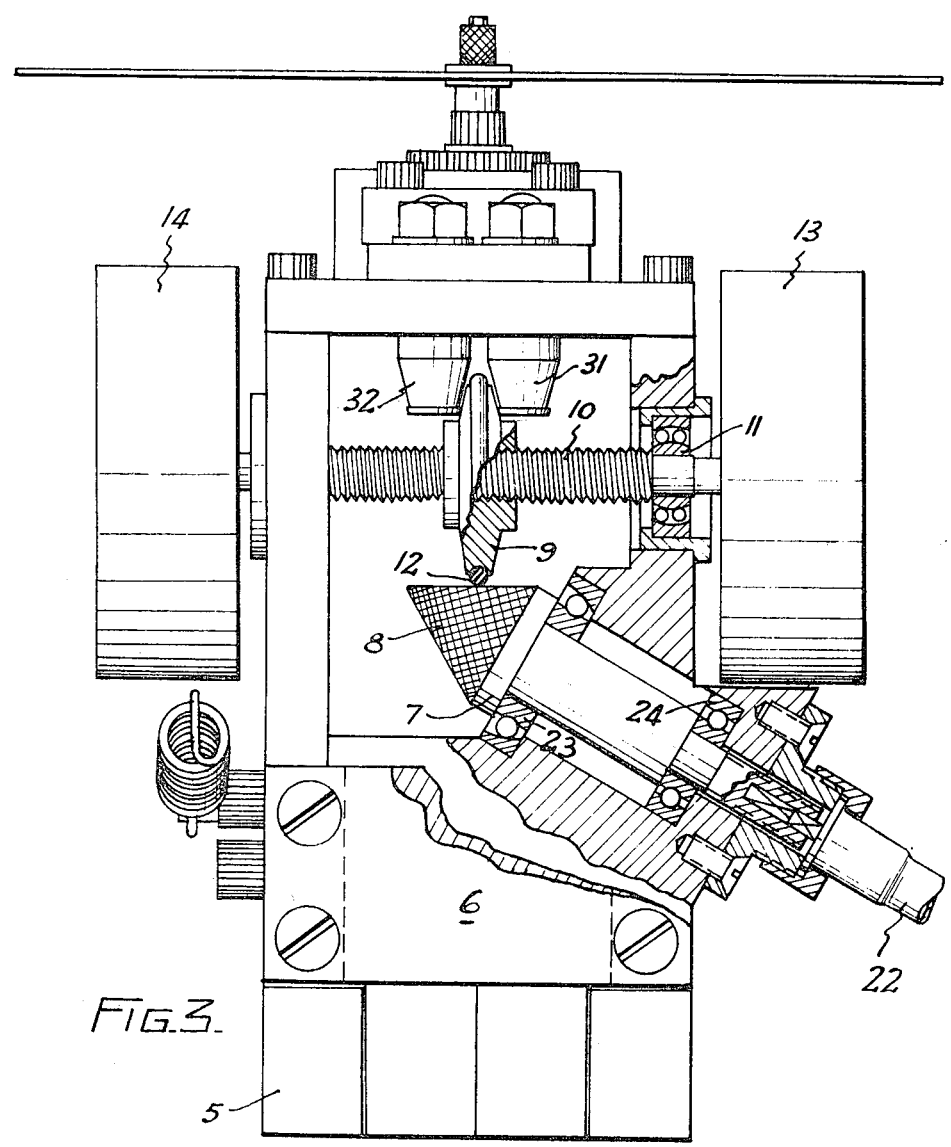

One embodiment of the invention defined in the preceding paragraph will now be described with reference to the accompanying drawings in which similar references indicate corresponding parts, and in which:

FIG. 1 shows, in plan view, an instrument constructed in accordance with the invention, FIG. 2 shows, in front elevation and partly in section, a view along the line 2—2 of FIG. 1, FIG. 3 shows, in side elevation and partly in section, a view along the line 3—3 of FIG. 1, and FIG. 4 shows, in side elevation and partly in section, a view along the line 4—4 of FIG. 2.

Upon referring to the drawings it will be seen that a frame 5 supports an alignment block 6 which is partly rotatable with respect to a seat formed in said frame. Mounted within a journal in the block 6 is a rotatable member 7 having a conical tip 8, the surface of which is suitably roughened to increase the frictional resistance thereof. A measuring disc 9 which is internally screw threaded is mounted upon a screw threaded shaft 10 which is freely rotatable with respect to bearings such as 11 but rigidly attached to the wheels 13 and 14. Preferably said disc has a tire or other high-friction device 12 mounted around its periphery. The wheel 13 is adapted to engage frictionally a further wheel 15 which is mounted upon the shaft 16 which is, in turn, mounted upon the bracket 17 which is capable of adjustment with respect to the frame 5 by partial rotation thereof about the pivot 18. Normally the frame 17 is drawn at its upper extremity towards the block 6 by means of the spring 19 which is mounted upon the pins 20 and 21.

A measuring roller in some external apparatus (not shown) which is rotatable at the unknown speed to be measured is adapted for engagement by the wheel 15 in a manner similar to that in which the tire 12 on the disc 9 engages the tip 8 of the rotatable member 7. Thus, upon making the necessary alignments for proper mutual engagement of the measuring member with the wheel 15, and the disc 9 with the rotatable member 7, by suitable mutual alignment of the block 6, the frame 5 and the frame 17, the rotatable member 7 is rotated by means of the shaft 22 from an external source of energy at some known speed with respect to the bearings 23 and 24. This causes the disc 9 to rotate in unison. If, now, the measuring shaft is rotated at some unknown speed which differs from the speed of rotation of the member 7, said shaft will cause the disc 9, which attempts to rotate also in unison with said shaft, to move along the screw upon the rotating shaft 10 until the tire 12 takes up some position on the tip 8 wherein the linear speeds of the respective surfaces in rolling contact are substantially the same. Thus, the lateral displacement of the disc 9 along the shaft 10 indicates visually the ratio between the speeds of said measuring roller and said positively driven rotatable member 7. If, therefore, the preset speed of the member 7 is known, the instrument may be calibrated so that the position of the disc 9 reads directly the speed of the measuring roller.

In a modification of the invention the speed of the measuring roller may be indicated not by the position of the disc 9 but by indicator means connected thereto. Said indicator means comprises, for example, the rotatable dial 25 which turns about the shaft 26 when the pinion 27 is rotated by the gear wheel 28 in response to the linear movement of the rack 29. Said rack is movable in the direction of the axis of the shaft 10 when the disc 9 is urged into contact with one or other of the rotatable friction-reducing conical rollers 31 and 32. The dial 25, which may be calibrated in known manner, is thus caused to rotate with reference to some fiduciary mark from which the speed of the measuring roller may be read. If desired, the position of the contacting point can be electrically indicated, at a place distant from the instrument, on a suitably graduated indicator.

In a further modification of the invention, limit switches or similar devices may be mounted on the instrument within the range of any of the moving parts constituting the disc 9 or rack 29, or from projections from gears 27 or 28, or the shaft 26, or the dial 25. SAid switches may be connected to means which vary the speed of the article or substance which causes the rotation of the measuring roller in order that the speed may be varied to contain the quantity being measured within the limits prescribed and determined by the indication arising from the position of disc 9 in relationship to the tip 8.

The conical tip 8 is preferably constructed from urethane or similar material and the disc 9 is preferably constructed from hardened steel or similar material. The cone angle, which has a significant effect upon the output of the instrument, is preferably 60°. The choice of this angle means that distances measured along the face of the conical tip 8 have a linear relationship with variations in the diameter of the section of the cone upon which the disc rolls. The conical tip 8 could be replaced by a tip of cylindrical section but such a device would provide no variation in output when a speed differential existed. Furthermore, said conical tip could be replaced by one having an asymptotic surface, which would give very fine reading variations over a limited range of the instrument, but in this case the output of the instrument would be logarithmic and not linear.

Various adaptations of the invention will be apparent to those skilled in the art. For example, in a so-called "mile per gallon" meter, the rate of flow of fuel can be made to rotate an impeller. This in turn can be caused to rotate a shaft such as 10. Similarly, the miles travelled may be represented by the number of revolutions of the member 7. Thus if the vehicle fitted with the system is at rest with its engine not running, neither shaft 10 nor member 7 would rotate. Upon the engine being started and upon the flow of fuel, shaft 10 would rotate, disc 9 and member 7 would not rotate, but disc 9 would be drawn along shaft 10 under the influence of the screw (the "-hand" of the screw thread being so arranged) towards the apex of the conical tip 8. As this is undesirable and damaging to the instrument a suitable clutch should be included to prevent rotation of the shaft 10 when the member 7 is at rest, as will be known to those skilled in the art. In the condition just described the fuel consumption would be irrelevant and not considered in terms of "miles per gallon." However, it the vehicle were in motion and the engine not running, member 7 would be rotated and shaft 10 stationary, and thus disc 9 would be rotated on the screw thread of shaft 10 and moved along the side of the conical tip 8 until the major diameter was passed and the rotation ceased to disc 9. In order that disc 9 can be returned into contact with conical tip 8 when conditions are changed the screw thread should terminate as the contact between disc 9 and conical tip 7 ceased.

It will be seen that in the case where the vehicle is in motion (as indicated by the rotating tip 8) and when no fuel is being consumed (as indicated by the stationary shaft 10) the consumption rate is:

$$\frac{\text{zero gallons}}{Y \text{ miles}} = \text{zero consumption};$$

however as the fuel consumption under such conditions would be zero rate (infinity miles per gallon) and as this is an impractical indication the major diameter of the conical tip would be such as to indicate beyond the highest expected mile per gallon rate (e.g., for a medium sized car, 50 miles per gallon). Since the major diameter of the cone can represent the highest m.p.g. rate and the apex can represent infinity consumption rate, it will be found by calculation that the length of the side of the cone can represent the intermediate consumption rate, and thus the position of the disc on the cones' side can represent the m.p.g. (in the case under consideration). Since, when both disc and cone rotated at rates within the parameters of the device and in the correct direction, and when the diameters involved are correct for the application, the shaft 10 will be rotated at a different rate to the disc until such times as the disc is rotated by rolling contact with the cone at the same rate of linear surface speed. When the circumference of the disc times the rotations of the shaft are equal to the rate of rotation of the cone times the circumference of the cone at the point where the disc is in contact with it, there will be no further relative rotation and the point of contact between the disc and the cone's side can be related to the distance between the apex and the major diameter along the cone's side and the m.p.g. rate read off by a suitably calibrated scale or dial. The calculation applicable is:

$$\frac{K \times R \times C}{r \times c} = \text{m.p.g.} \quad (1)$$

when $K$ = highest expected m.p.g. rate;
$R$ = revolutions of cone per mile travelled;
$C$ = circumference of cone at point of contact with diameter;
$r$ = revolutions of measuring shaft per gallon consumed.
$c$ = circumference of disc at point of contact with cone.
Also, as $K$ = highest expected m.p.g. rate; and it is represented by the major diameter of the cone; and as the apex of the cone represents zero m.p.g. then the distance along the side of the cone can represent K to zero m.p.g.; thus, by calculation:

$$\frac{K \times l}{L} = \text{m.p.g.} \quad (2)$$

when $K$ = highest expected m.p.g. rate;
$L$ = length of side of cone;
$l$ = length of distance between contacting point of disc on the side of the cone to the apex of the cone.

It is possible to relate the miles-per-gallon rate to the position of the disc on the side of the cone in relation to its distance from the apex of the cone. The same theory holds true if the cone is in the form of the frustum of a cone, in which case the position of the apex is presumed and the calculation of m.p.g. is fixed from the major diameter and its related "K" factor.

From the foregoing description it will be realized that if two quantities can be represented as rotation and if the rotation is sufficiently energetic to cause (directly or by amplification of effort) the rotation of either the cone or the measuring shaft (as the case may be) respectively and if the rate of rotation can be directly or by ratio variation converted to $R \times C$, or $r \times c$, respectively as in equation (1), then the method of this invention can be applied.

As an indication of some of the applications of this invention the following are listed:
Miles-per-gallon indication; Yarn-to-fabric consumption rate; Yarn-to-machine production rate; Production efficiency percentage rate; Event-to-time rate; Average velocity rate; Linear-to-weight relationship rate; Load-to-effort rate; Weight-to-volume rate; and other similar applications of either average or unit-to-unit indication.

I claim:
1. A speed measuring instrument comprising:
   a. a measuring shaft rotatable at an unknown speed,
   b. a measuring disc rotatably mounted on said measuring shaft adapted for axial translation along said shaft,
   c. a rotatable member driven at a known speed by a shaft with an axis of rotation at an angle to said measuring shaft,
   d. a conical tip having an angle of approximately 60° supported solely by said rotatable member so that its pointed end is clear of any bearing means and positioned so that its surface is parallel to said measuring shaft and in frictional engagement with said measuring disc,
whereby the axial translation of said disc along its axis of rotation indicates the speed of said measuring shaft.

2. A speed measuring instrument as claimed in claim 1, wherein a screw thread is formed upon said shaft and in the bore of said measuring disc to assist the axial translation of said disc along its axis of rotation to indicate the speed of the said shaft.

3. A speed measuring instrument as claimed in claim 1 including comprising an indicator the readings of which are proportional to the movement of said disc along said axis of rotation from a reference position.

4. A speed measuring instrument as claimed in claim 3 wherein said indicator comprises a dial rotatable with respect to a fiduciary mark by a gear train in turn operable by a rack translatable by contact between said measuring disc and at one least or other of a pair of friction-reducing rollers mounted rigidly with respect to said rack.

5. A speed measuring instrument as claimed in claim 1 including at least one limit switch adapted to produce signals upon engagement by said by disc or by an element movable in response to the axial movement of said disc, said signals being adapted to operate means which vary the speed of said measuring shaft.

6. A speed measuring instrument as claimed in claim 1 wherein a shaft about which said measuring disc is rotatable is pivoted at or near one end of said shaft.

7. A speed measuring instrument as claimed in claim 1, wherein a tire is mounted upon the periphery of said measuring disc.

8. The device of claim 1 including a first drive wheel secured to said measuring shaft, a second drive wheel frictionally engaging said first wheel and adapted to also frictionally engage the moving surface of the article whose speed is to be measured, said second wheel being rotatably mounted on a support which is resiliently biassed toward said first wheel to insure frictional engagement between the wheels.

* * * * *